US010138872B2

(12) United States Patent
Carr et al.

(10) Patent No.: US 10,138,872 B2
(45) Date of Patent: Nov. 27, 2018

(54) SYSTEM AND METHOD FOR DETECTING GROUND BRUSH LIFTING (71) Applicant: General Electric Company, Schenectady, NY (US)

(72) Inventors: Christopher Carr, Atlanta, GA (US); Zachary Troope, Atlanta, GA (US); Brian Manikas, Schenectady, NY (US); Erin Lee Krumenacker, Greenville, SC (US); Lauren Ashley Wyant, Greer, SC (US); Christopher Robert Savio, Greenville, SC (US); Michael Graham McClure, Albany, NY (US)

(73) Assignee: General Electric Company, Schenectady, NY (US)

( * ) Notice: Subject to any disclaimer, the term of this patent is extended or adjusted under 35 U.S.C. 154(b) by 65 days.

(21) Appl. No.: 15/270,086

(22) Filed: Sep. 20, 2016

(65) Prior Publication Data
US 2018/0080434 A1    Mar. 22, 2018

(51) Int. Cl.
*G01R 15/16* (2006.01)
*F03D 9/00* (2016.01)
*H02J 3/38* (2006.01)
*H02P 9/00* (2006.01)
*F03D 9/25* (2016.01)

(52) U.S. Cl.
CPC ............... *F03D 9/003* (2013.01); *F03D 9/25* (2016.05); *H02J 3/386* (2013.01); *H02P 9/007* (2013.01)

(58) Field of Classification Search
CPC .. G01R 31/343; G01R 27/2605; G01R 31/34; G01R 31/025; G01R 31/12; G01R 31/346; G01R 15/16; G01R 31/028

USPC .............. 324/765.01, 510, 658, 661, 545; 340/682, 648, 635, 647, 645
See application file for complete search history.

(56) References Cited

U.S. PATENT DOCUMENTS

| 4,147,982 A | * | 4/1979 | Emery ................. G01R 31/343 |
| | | | 324/510 |
| 4,311,918 A | * | 1/1982 | Vaseen ....................... F03D 1/00 |
| | | | 290/55 |
| 5,032,826 A | * | 7/1991 | Miller .................... G01R 31/34 |
| | | | 324/510 |

(Continued)

FOREIGN PATENT DOCUMENTS

WO    WO2006/134068 A1    12/2006

*Primary Examiner* — Jermele M Hollington
*Assistant Examiner* — Taqi Nasir
(74) *Attorney, Agent, or Firm* — Dority & Manning, P.A.

(57) ABSTRACT

The present subject matter is directed to a system and method for detecting lifting of a ground brush of a generator of an electrical power system connected to a power grid so as to prevent damage to the electrical power system (e.g. bearing failure). The method includes monitoring, via at least one sensor, a voltage signal of a rotor shaft of the generator. The method also includes determining at least one characteristic (e.g. amplitude and/or frequency) of the voltage signal for a predetermined time period. Further, the method includes determining whether the at least one characteristic of the voltage signal is above a predetermined threshold, wherein the at least one characteristic of the voltage signal being above the predetermined threshold is indicative of the ground brush being lifted.

11 Claims, 6 Drawing Sheets (56) References Cited

U.S. PATENT DOCUMENTS

| | | | | |
|---|---|---|---|---|
| 6,460,013 | B1* | 10/2002 | Nippes | G01R 31/343 |
| | | | | 702/183 |
| 7,034,706 | B1* | 4/2006 | Nippes | G01R 31/343 |
| | | | | 340/635 |
| 8,610,591 | B2* | 12/2013 | Kretschmer | H02K 11/40 |
| | | | | 324/658 |
| 9,074,912 | B2* | 7/2015 | Hassel | F16C 19/52 |
| 2002/0124663 | A1* | 9/2002 | Tokumoto | B62D 6/10 |
| | | | | 73/862.333 |
| 2007/0063677 | A1* | 3/2007 | Schauder | H02P 9/42 |
| | | | | 322/29 |
| 2009/0278352 | A1* | 11/2009 | Rivas | F03D 7/0224 |
| | | | | 290/44 |
| 2012/0319723 | A1* | 12/2012 | Hassel | H02K 11/20 |
| | | | | 324/765.01 |
| 2014/0359351 | A1* | 12/2014 | Shah | H02H 7/261 |
| | | | | 714/14 |
| 2016/0118867 | A1* | 4/2016 | Iwata | H02K 11/0042 |
| | | | | 310/68 B |

\* cited by examiner

SYSTEM AND METHOD FOR DETECTING GROUND BRUSH LIFTING

FIELD OF THE INVENTION

The present disclosure relates generally to wind turbines and, more particularly, to a system and method for detecting lifting of a ground brush of a generator of a wind turbine by monitoring rotor shaft voltage of a rotor of the generator.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

In many wind turbines, the generator may be electrically coupled to a bi-directional power converter that includes a rotor-side converter joined to a line-side converter via a regulated DC link. Such wind turbine power systems are generally referred to as a doubly-fed induction generator (DFIG). DFIG operation is typically characterized in that the rotor circuit is supplied with current from a current-regulated power converter. As such, the wind turbine produces variable mechanical torque due to variable wind speeds and the power converter ensures this torque is converted into an electrical output at the same frequency of the grid.

During operation, wind impacts the rotor blades and the blades transform wind energy into a mechanical rotational torque that drives a low-speed shaft. The low-speed shaft is configured to drive the gearbox that subsequently steps up the low rotational speed of the low-speed shaft to drive a high-speed shaft at an increased rotational speed. The high-speed shaft is generally coupled to the generator so as to rotatably drive a generator rotor. As such, a rotating magnetic field may be induced by the generator rotor and a voltage may be induced within a generator stator. Rotational energy is converted into electrical energy through electromagnetic fields coupling the rotor and the stator, which is supplied to a power grid via a grid breaker. Thus, the main transformer steps up the voltage amplitude of the electrical power such that the transformed electrical power may be further transmitted to the power grid.

Capacitive coupling between the rotor and the stator, though not the main contributor to the generated power, can induce an undesirable rotor shaft voltage in the rotor. Under normal operating conditions, the current driven by the rotor shaft voltage is safely dissipated through a ground brush that is in contact with the rotor and ground. However, if the ground brush is not in contact with the rotor, voltage can build up on the rotor shaft. As the voltage builds up, it will discharge to ground using the lowest impedance path. For doubly-fed induction generators (DFIGs), this path corresponds to the oil in the bearing housing. As such, the voltage can discharge in a pulse, causing an arc. This cycle can be repeated as long as the ground brush is lifted, causing pitting and fluting of the bearing track which ultimately leads to bearing failure.

Thus, the present disclosure is directed to a system and method for monitoring rotor shaft voltage of a wind turbine generator to detect when ground brush lifting occurs so as to address the aforementioned issues.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for detecting lifting of a ground brush of a generator of an electrical power system connected to a power grid. The method includes monitoring, via at least one sensor, a voltage signal of a rotor shaft of the generator. The method also includes determining at least one characteristic of the voltage signal for a predetermined time period. Further, the method includes determining whether the at least one characteristic of the voltage signal is above a predetermined threshold, wherein the at least one characteristic of the voltage signal being above the predetermined threshold is indicative of the ground brush being lifted.

In one embodiment, the characteristic(s) of the voltage signal may include an amplitude, a frequency, or any other suitable component of the voltage signal. As such, in another embodiment, the step of determining whether the at least one characteristic of the voltage signal is above the predetermined threshold may include determining whether the amplitude of the voltage signal is above a predetermined amplitude threshold for the predetermined time period. In addition, the step of determining whether the at least one characteristic of the voltage signal is above a predetermined threshold may include determining whether the frequency of the voltage signal is within a predetermined frequency band. In certain embodiments, the predetermined frequency band may correspond to a frequency band of a switching circuit (e.g. an IGBT switching circuit) of a power converter of the electrical power system. More specifically, in one embodiment, the measurement frequency band may be centered at the operating frequency of the power converter; however, the size of the frequency band may not be the same size as the operating band for the power converter but rather could be at least one order of magnitude larger.

In further embodiments, the method may also include implementing, via a controller, a control action when the at least one characteristic of the voltage signal is above the predetermined threshold so as to prevent damage to the electrical power system (e.g. the generator bearings). More specifically, in certain embodiments, the step of implementing the control action may include opening a normally closed contact of the electrical power system.

In additional embodiments, the sensor(s) may be mounted on a shaft-side of a bearing housing of the generator. In addition, the sensor(s) may be mounted at any other suitable location such that the sensor can monitor the rotor shaft voltage. More specifically, the location of the sensor(s) may be determined as a function of the location of the generator rotor. For example, in one embodiment, the sensor(s) is close enough to the generator rotor to allow for sufficient coupling, while also being mounted using an electrically isolated support system.

In particular embodiments, the generator of the electrical power system may include a doubly-fed induction generator (DFIG). Further, in certain embodiments, the electrical power system may be part of a wind turbine power system.

In another aspect, the present disclosure is directed to a method for preventing damage of a generator of a wind turbine power system connected to a power grid. The method includes monitoring, via at least one sensor, a voltage signal of a rotor shaft of the generator. Further, the method includes determining at least one characteristic of the voltage signal for a predetermined time period. The method also includes determining whether the at least one characteristic of the voltage signal is above a predetermined threshold, wherein the at least one characteristic of the voltage signal being above the predetermined threshold is indicative of the ground brush being lifted. Further, the method includes implementing, via a turbine controller, a control action when the at least one characteristic of the voltage signal is above the predetermined threshold so as to prevent damage to the generator of the wind turbine power system. It should be understood that the method may further include any of the additional steps and/or features as described herein.

In yet another aspect, the present disclosure is directed to an electrical power system connected to a power grid. The electrical power system includes a generator having a rotor and a stator, at least one sensor configured to monitor a voltage signal of a rotor shaft of the rotor, and a controller configured to control the electrical power system. The controller is configured to perform one or more operations, including but not limited to determining at least one of an amplitude or a frequency of the voltage signal for a predetermined time period and determining whether at least one of the amplitude or the frequency is above a predetermined threshold. It should be understood that the electrical power system may further include any of the additional features as described herein. As such, the controller may be further configured to perform any of the additional method steps and/or functions as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a system and method for detecting lifting of a ground brush of a generator (e.g. a DFIG) of an electrical power system (such as a wind turbine power system) connected to a power grid. When the ground brush is lifted, a lift component or signal exists in the rotor shaft voltage. The lift component is characterized by having a high amplitude at the same frequency of the IGBT switching circuit used in the power converter of the variable frequency drive. As such, the present disclosure is designed to determine if the generator ground brush is operating correctly by detecting the lift component in the rotor shaft voltage based on its known frequency and amplitude.

More specifically, in certain embodiments, at least one sensor (that may be mounted on the shaft-side of the generator bearing housing) continuously monitors the rotor shaft voltage. A controller analyzes the voltage signal internally to determine if it is within a predetermined frequency band as well as if it is above a predetermined amplitude threshold. If the measured signal remains within the acceptable frequency band and above the threshold amplitude for a predetermined period of time, the ground brush is assumed to be lifted and a normally closed contact can be opened. This contact can be connected to an external relay that communicates with the turbine control system. As such, the control system can detect a change in state of the contact and alert an operator of a brush lift event, thereby preventing damage to the generator and/or other components of the electrical power system.

As such, the present disclosure provides many advantages not present in the prior art. For example, detection of a ground brush lift event reduces the occurrence of generator bearing failures, which can be expensive and time-consuming to repair. In addition, the present disclosure may be used to test and validate new brush systems. Further, the present disclosure may be used as a retrofit for existing units. As such, the generator does not need to be disassembled and/or modified.

Figure 1:
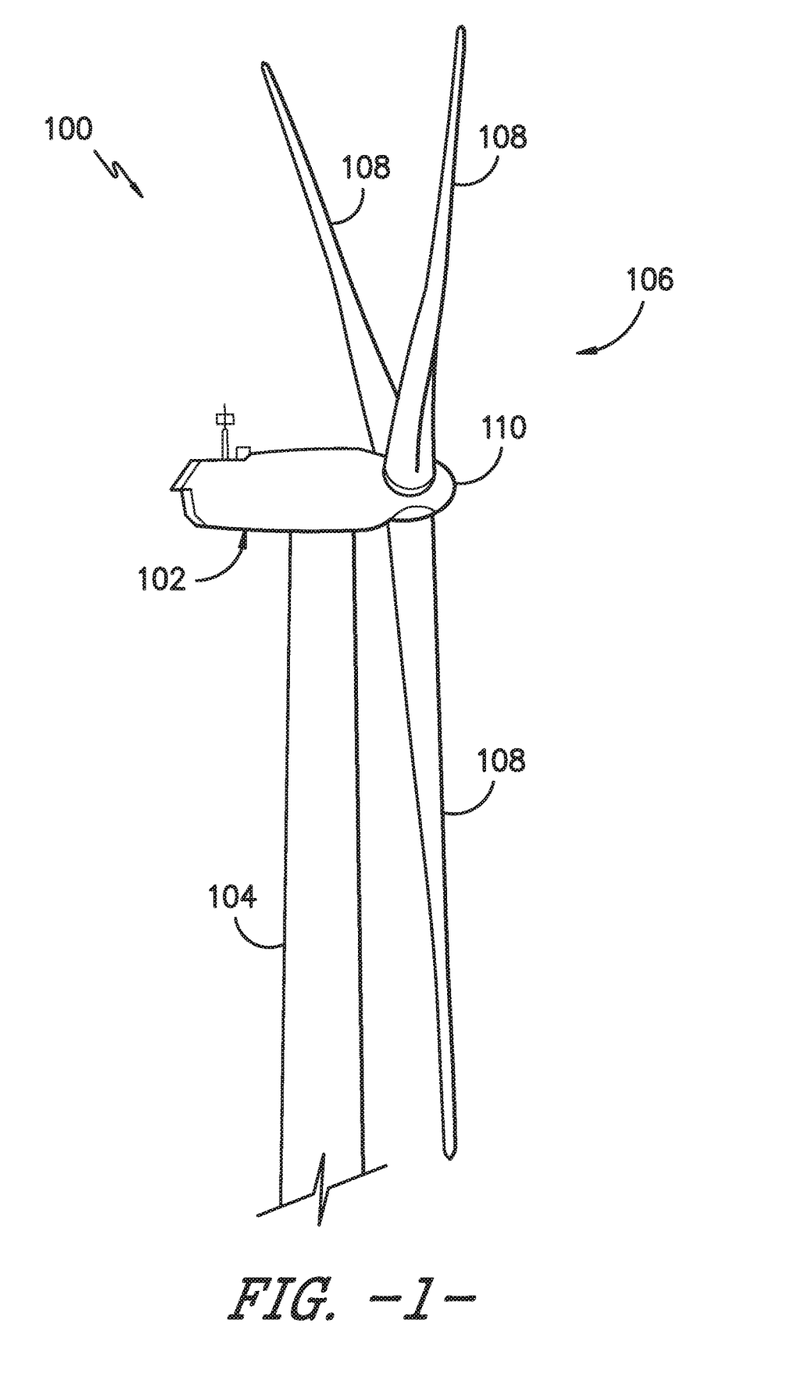
FIG. 1 illustrates a perspective view of a portion of one embodiment of a wind turbine according to the present disclosure.

Referring now to the drawings, FIG. 1 illustrates a perspective view of a portion of an exemplary wind turbine 100 according to the present disclosure that is configured to implement the method as described herein. The wind turbine 100 includes a nacelle 102 that typically houses a generator (not shown). The nacelle 102 is mounted on a tower 104 having any suitable height that facilitates operation of wind turbine 100 as described herein. The wind turbine 100 also includes a rotor 106 that includes three blades 108 attached to a rotating hub 110. Alternatively, the wind turbine 100 may include any number of blades 108 that facilitates operation of the wind turbine 100 as described herein.

Figure 2:
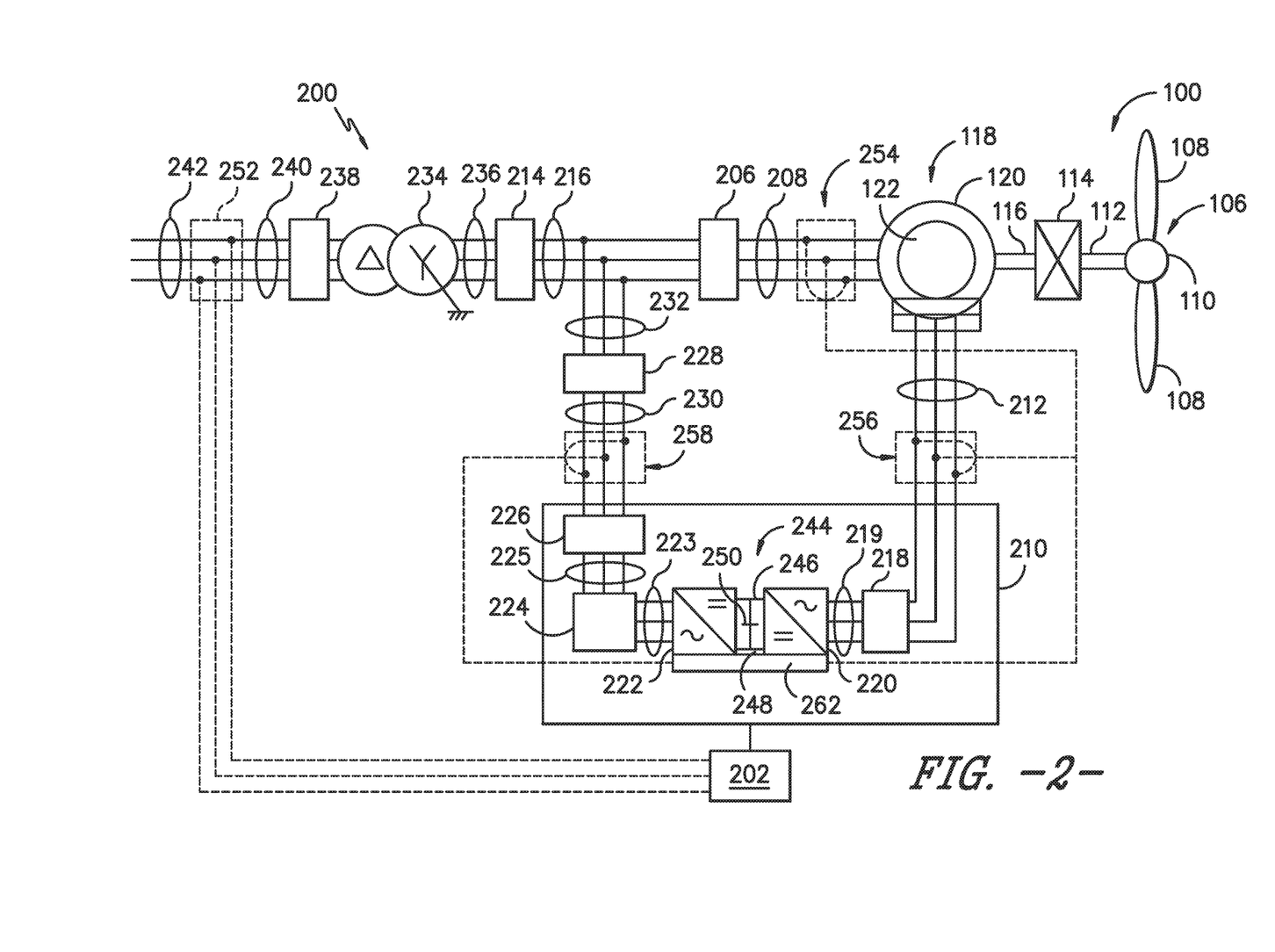
FIG. 2 illustrates a schematic view of one embodiment of an electrical power system suitable for use with the wind turbine shown in FIG. 1.
Figure 5:
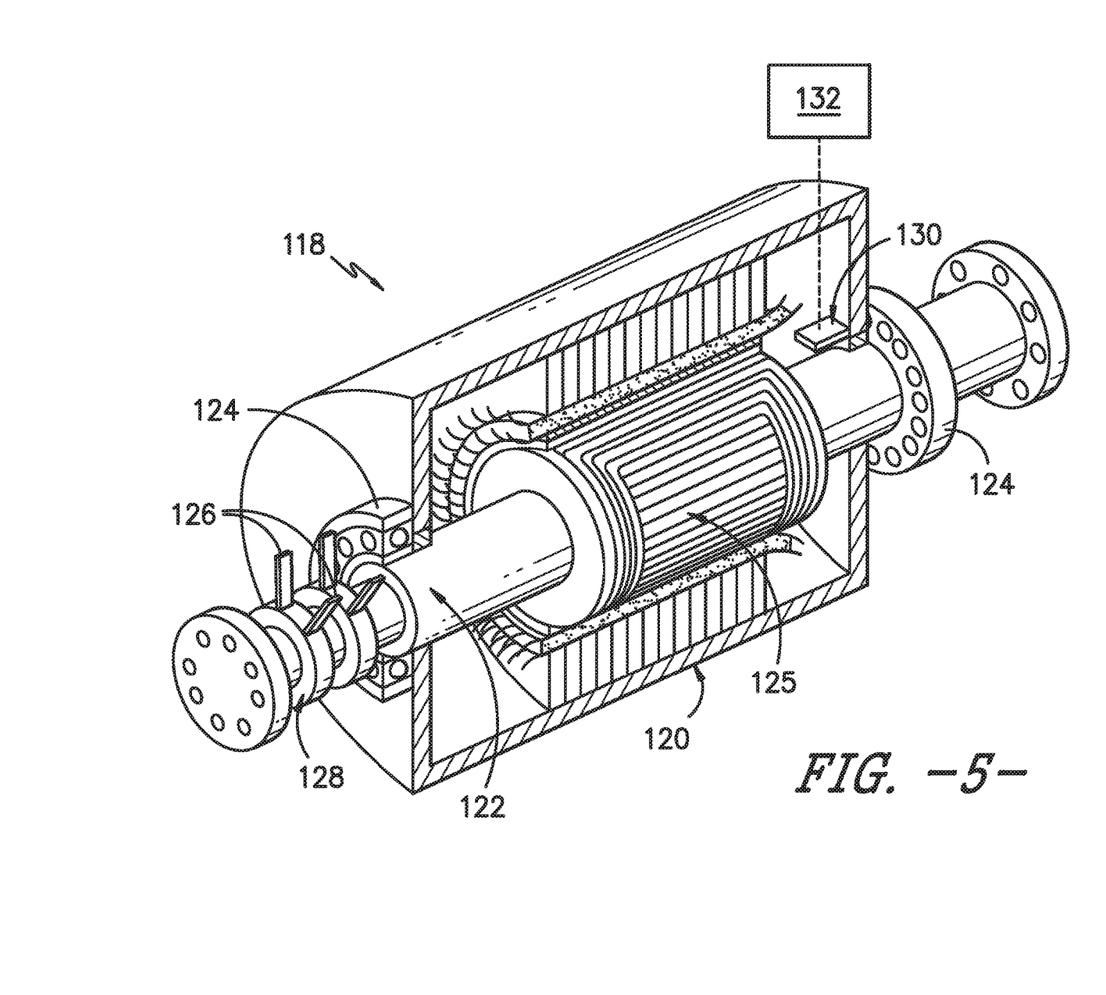
FIG. 5 illustrates a cross-sectional schematic view of one embodiment of a generator according to the present disclosure, particularly illustrating a ground brush contacting the rotor of the generator.

Referring now to FIG. 2, a schematic view of one embodiment of an electrical power system 200 that may be used with the wind turbine 100 is illustrated. During operation, wind impacts the blades 108 and the blades 108 transform wind energy into a mechanical rotational torque that rotatably drives a low-speed shaft 112 via the hub 110. The low-speed shaft 112 is configured to drive a gearbox 114 that subsequently steps up the low rotational speed of the low-speed shaft 112 to drive a high-speed shaft 116 at an increased rotational speed. The high-speed shaft 116 is generally rotatably coupled to a generator 118 so as to rotatably drive a generator rotor 122 having field winding 125 (FIG. 5). In one embodiment, the generator 118 may be a wound rotor, three-phase, doubly-fed induction (asynchronous) generator (DFIG) that includes a generator stator 120 magnetically coupled to a generator rotor 122. As such, a rotating magnetic field may be induced by the generator rotor 122 and a voltage may be induced within a generator stator 120 that is magnetically coupled to the generator rotor 122. In one embodiment, the generator 118 is configured to convert the rotational mechanical energy to a sinusoidal, three-phase alternating current (AC) electrical energy signal in the generator stator 120. The associated electrical power can be transmitted to a main transformer 234 via a stator bus 208, a stator synchronizing switch 206, a system bus 216, a main transformer circuit breaker 214, and a generator-side bus 236. The main transformer 234 steps up the voltage amplitude of the electrical power such that the transformed electrical power may be further transmitted to a grid via a grid circuit breaker 238, a breaker-side bus 240, and a grid bus 242.

Figure 3:
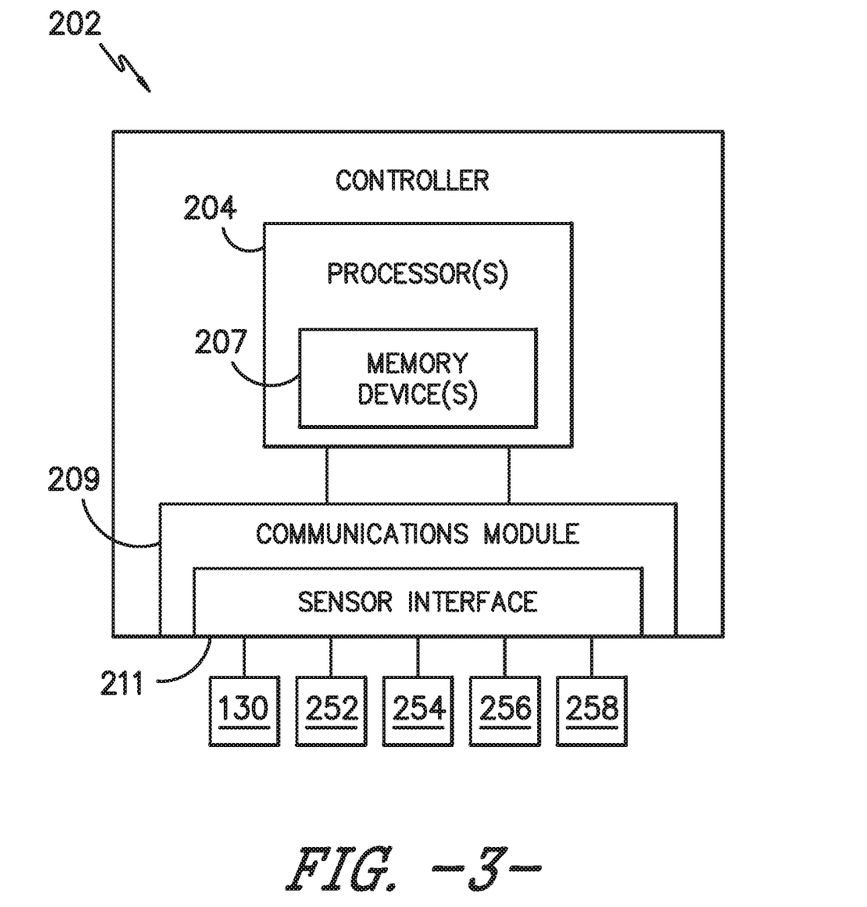
FIG. 3 illustrates a block diagram of one embodiment of a controller suitable for use with the wind turbine shown in FIG. 1.

In addition, the electrical power system 200 may include a wind turbine controller 202 configured to control any of the components of the wind turbine 100 and/or implement the method steps as described herein. For example, as shown particularly in FIG. 3, the controller 202 may include one or more processor(s) 204 and associated memory device(s) 207 configured to perform a variety of computer-implemented functions (e.g., performing the methods, steps, calculations and the like and storing relevant data as disclosed herein). Additionally, the controller 202 may also include a communications module 209 to facilitate communications between the controller 202 and the various components of the wind turbine 100, e.g. any of the components of FIG. 2. Further, the communications module 209 may include a sensor interface 211 (e.g., one or more analog-to-digital converters) to permit signals transmitted from one or more sensors to be converted into signals that can be understood and processed by the processors 204. It should be appreciated that the sensors (e.g. sensors 130, 252, 254, 256, 258) may be communicatively coupled to the communications module 209 using any suitable means. For example, as shown in FIG. 3, the sensors 130, 252, 254, 256, 258 may be coupled to the sensor interface 211 via a wired connection. However, in other embodiments, the sensors 130, 252, 254, 256, 258 may be coupled to the sensor interface 211 via a wireless connection, such as by using any suitable wireless communications protocol known in the art. As such, the processor 204 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 204 is also configured to compute advanced control algorithms and communicate to a variety of Ethernet or serial-based protocols (Modbus, OPC, CAN, etc.). Additionally, the memory device(s) 207 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 207 may generally be configured to store suitable computer-readable instructions that, when implemented by the processor(s) 204, configure the controller 202 to perform the various functions as described herein.

Referring back to FIG. 2, the generator stator 120 may be electrically coupled to a stator synchronizing switch 206 via a stator bus 208. In one embodiment, the generator rotor 122 may be electrically coupled to a bi-directional power conversion assembly 210 or power converter via a rotor bus 212. Alternatively, the generator rotor 122 may be electrically coupled to the rotor bus 212 via any other device that facilitates operation of electrical power system 200 as described herein. In a further embodiment, the stator synchronizing switch 206 may be electrically coupled to a main transformer circuit breaker 214 via a system bus 216.

The power conversion assembly 210 may include a rotor filter 218 that is electrically coupled to the generator rotor 122 via the rotor bus 212. In addition, the rotor filter 218 may include a rotor-side reactor. A rotor filter bus 219 electrically couples the rotor filter 218 to a rotor-side power converter 220. Further, the rotor-side power converter 220 may be electrically coupled to a line-side power converter 222 via a single direct current (DC) link 244. Alternatively, the rotor-side power converter 220 and the line-side power converter 222 may be electrically coupled via individual and separate DC links. In addition, as shown, the DC link 244 may include a positive rail 246, a negative rail 248, and at least one capacitor 250 coupled therebetween.

In addition, a line-side power converter bus 223 may electrically couple the line-side power converter 222 to a line filter 224. Also, a line bus 225 may electrically couple the line filter 224 to a line contactor 226. In addition, the line filter 224 may include a line-side reactor. Moreover, the line contactor 226 may be electrically coupled to a conversion circuit breaker 228 via a conversion circuit breaker bus 230. In addition, the conversion circuit breaker 228 may be electrically coupled to the main transformer circuit breaker 214 via system bus 216 and a connection bus 232. The main transformer circuit breaker 214 may be electrically coupled to an electric power main transformer 234 via a generator-side bus 236. The main transformer 234 may be electrically coupled to a grid circuit breaker 238 via a breaker-side bus 240. The grid circuit breaker 238 may be connected to the electric power transmission and distribution grid via a grid bus 242.

Figure 4:
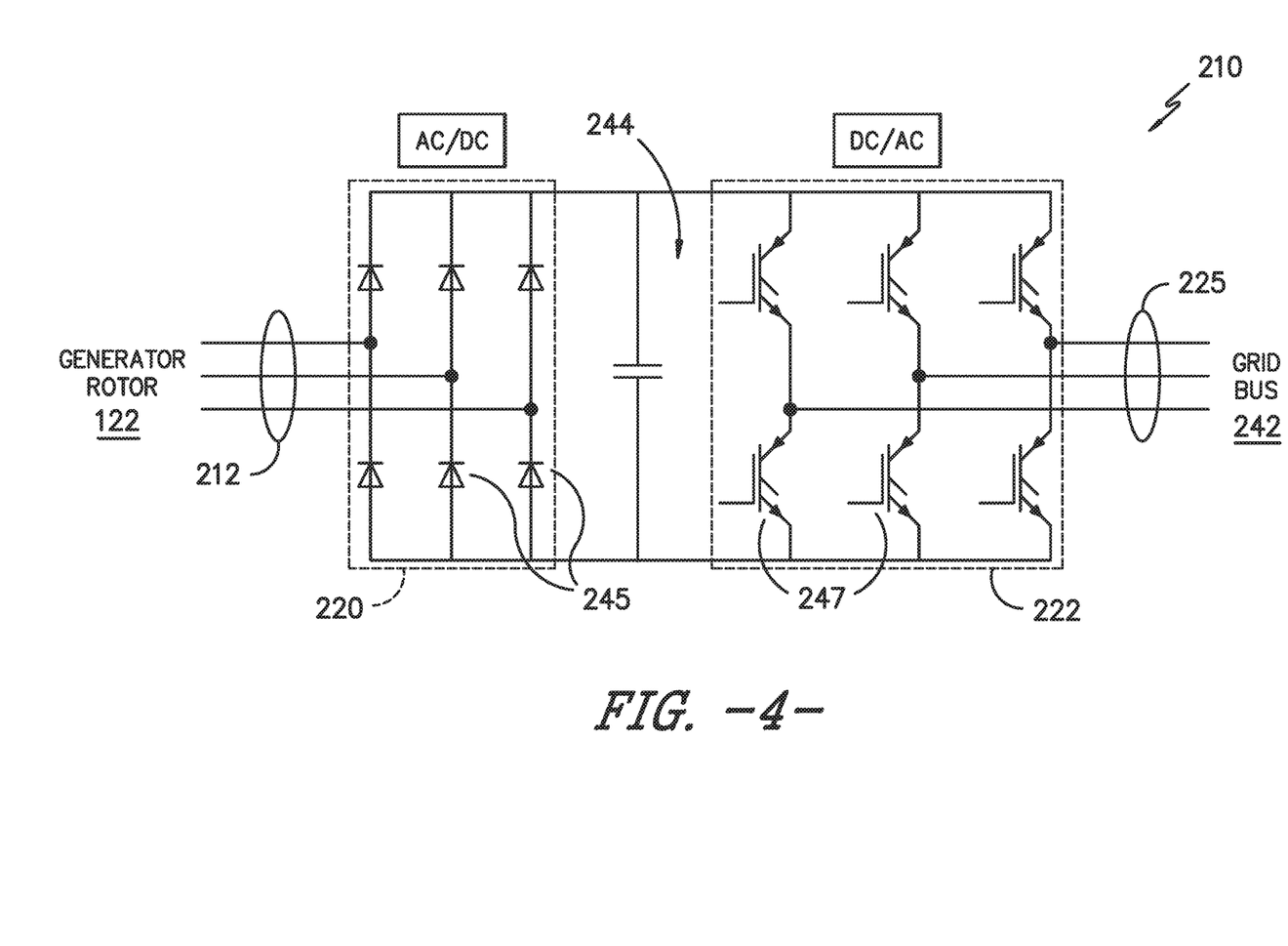
FIG. 4 illustrates a simplified schematic diagram of one embodiment of a variable frequency drive (VFD) that maintains a constant electrical frequency output on the grid side of the generator according to the present disclosure.

Referring particularly to FIGS. 2 and 4, alternating current (AC) power generated at the generator stator 120 by rotation of the rotor 106 is provided via a dual path to the grid bus 242. The dual paths are defined by the stator bus 208 and the rotor bus 212. On the rotor bus side 212, sinusoidal multi-phase (e.g. three-phase) AC power is provided to the power conversion assembly 210. The rotor-side power converter 220 converts the AC power provided from the rotor bus 212 into DC power and provides the DC power to the DC link 244. Switching elements 245 (e.g. IGBTs) used in bridge circuits of the rotor side power converter 220 can be modulated to convert the AC power provided from the rotor bus 212 into DC power suitable for the DC link 244.

The line side converter 222 converts the DC power on the DC link 244 into AC output power suitable for the electrical grid bus 242. In particular, switching elements 247 (e.g. IGBTs) used in bridge circuits of the line side power converter 222 can be modulated to convert the DC power on the DC link 244 into AC power on the line side bus 225. The AC power from the power conversion assembly 210 can be combined with the power from the stator 120 to provide multi-phase power (e.g. three-phase power) having a frequency maintained substantially at the frequency of the electrical grid bus 242 (e.g. 50 Hz/60 Hz).

It should be understood that the rotor-side power converter 220 and the line-side power converter 222 may have any configuration using any switching devices that facilitate operation of electrical power system 200 as described herein. For example, FIG. 4 illustrates a simplified schematic diagram of one embodiment of a variable frequency drive (VFD) that maintains a constant electrical frequency output on the grid side of the generator 118. As shown, the VFD configuration includes a six-switch voltage-sourced rectifier on the rotor side converter 220, a DC link capacitor 244 to minimize DC voltage variation, and a six-switch voltage-sourced inverter utilizing pulse width modulation on the grid side. Rotor-side switching elements 245 are often diodes or silicon controlled rectifiers (SCR), while the grid side-switching elements 247 are often insulated gate bipolar transistors (IGBTs). As such, the magnitude and electrical frequency of the current supplied to the generator rotor 122 through the VFD may be varied to account for changes in the rotor shaft speed and to maintain a constant output on the generator stator winding.

Further, the power conversion assembly 210 may be coupled in electronic data communication with the turbine controller 202 and/or a separate or integral converter controller 262 to control the operation of the rotor-side power converter 220 and the line-side power converter 222. For example, during operation, the controller 202 may be configured to receive one or more voltage and/or electric current measurement signals from the first set of voltage and electric current sensors 252. Thus, the controller 202 may be configured to monitor and control at least some of the operational variables associated with the wind turbine 100 via the sensors 252. In the illustrated embodiment, each of the sensors 252 may be electrically coupled to each one of the three phases of the power grid bus 242. Alternatively, the sensors 252 may be electrically coupled to any portion of electrical power system 200 that facilitates operation of electrical power system 200 as described herein. In addition to the sensors described above, the sensors may also include a second set of voltage and electric current sensors 254, a third set of voltage and electric current sensors 256, a fourth set of voltage and electric current sensors 258 (all shown in FIG. 2), and/or any other suitable sensors.

It should also be understood that any number or type of voltage and/or electric current sensors 130, 252, 254, 256, 258 may be employed within the wind turbine 100 and at any location. For example, the sensors may be current transformers, shunt sensors, rogowski coils, Hall Effect current sensors, Micro Inertial Measurement Units (MIMUs), or similar, and/or any other suitable voltage or electric current sensors now known or later developed in the art.

Thus, the converter controller 262 is configured to receive one or more voltage and/or electric current feedback signals from the sensors 130, 252, 254, 256, 258. More specifically, in certain embodiments, the current or voltage feedback signals may include at least one of line feedback signals, line-side converter feedback signals, rotor-side converter feedback signals, or stator feedback signals. For example, as shown in the illustrated embodiment, the converter controller 262 receives voltage and electric current measurement signals from the second set of voltage and electric current sensors 254 coupled in electronic data communication with stator bus 208. The converter controller 262 may also receive the third and fourth set of voltage and electric current measurement signals from the third and fourth set of voltage and electric current sensors 256, 258. In addition, the converter controller 262 may be configured with any of the features described herein in regards to the main controller 202. As such, the converter controller 262 is configured to implement the various method steps as described herein and may be configured similar to the turbine controller 202.

Figure 6:
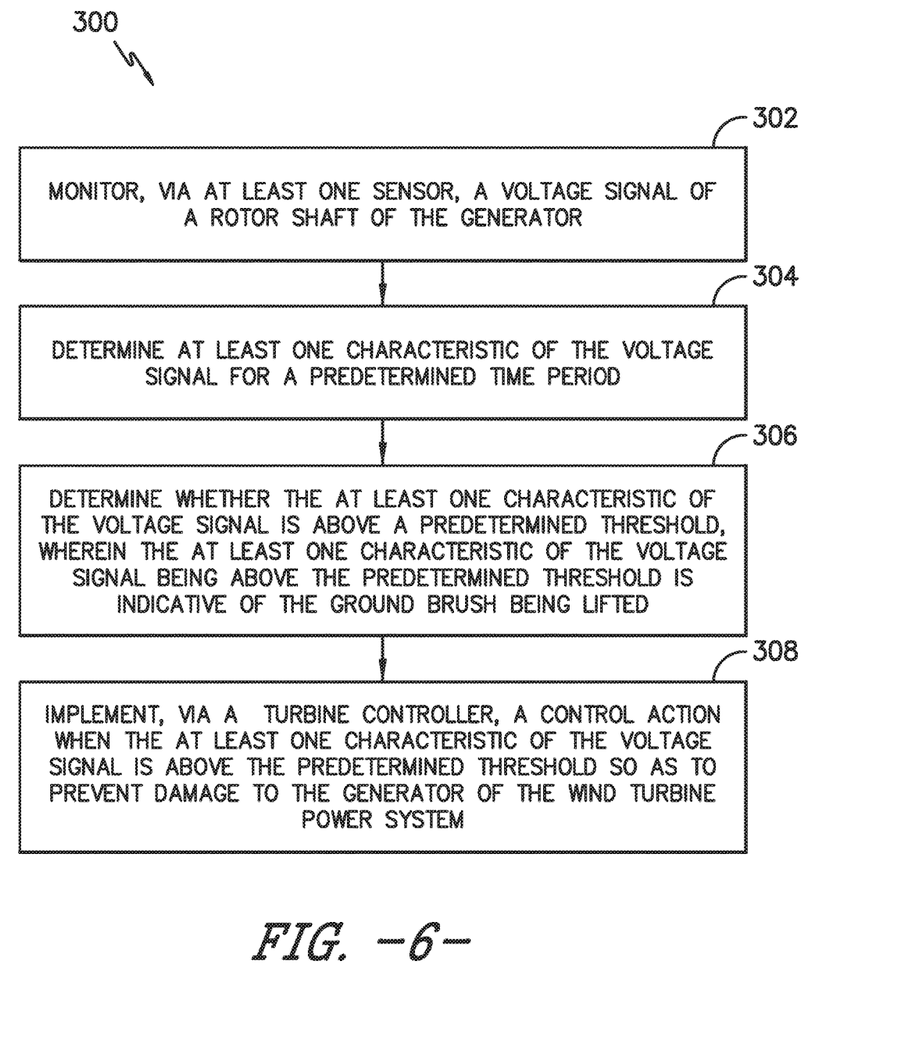
FIG. 6 illustrates a flow diagram of one embodiment of a method for detecting lifting of a ground brush of a generator of an electrical power system according to the present disclosure.

Referring now to FIGS. 5 and 6, various illustrations are provided to further describe the systems and methods of the present disclosure. For example, FIG. 5 illustrates a perspective cross-sectional view of one embodiment of the generator 118 of the present disclosure, particularly illustrating a plurality of brushes 126 configured with the rotor 122 thereof; and FIG. 6 illustrates a flow diagram of one embodiment of a method 300 for detecting lifting of the ground brush 126 of the generator 118 of the electrical power system 200.

During wind turbine operation, voltage is typically induced on the rotor shaft due to capacitive coupling between the generator rotor 122 and the stator 120. The capacitive coupling is directly related to the variable frequency drive (VFD) operation because a change in voltage over time (dv/dt) results in capacitive coupling. In addition, non-symmetry of the generator magnetic field may also cause rotor shaft voltage. Under normal operating conditions, the current driven by this induced shaft voltage is safely dissipated through one or more of the brushes 126. In general, such brushes act as sliding contacts between the rotating slip ring and the stationary bus bars. Further, such brushes are typically constructed from a graphite/metal composite that is pressed into rectangular bar shapes and are typically mounted on the non-drive end of the generator 118. A wind turbine generator, such as generator 118, may include any number of brushes 126, including particularly at least one ground brush. Further, as shown in FIG. 5, the brushes 126 may be mounted perpendicular to the rotor shaft. Alternatively, the brushes 126 may have any other suitable mounting configuration with respect to the generator rotor 122. As such, some of the brushes may be used to pull AC voltage off of the generator slip ring 128, while the remaining brush(es) act as a controlled path to ground (i.e. a ground brush). Further, as shown, the brushes 126 may be positioned radially outward of the slip ring(s) 128, with consecutive brushes in each set mounted 60 to 120 degrees apart. In addition, each brush 126 may be rigidly fixed in its axial position so as to minimize deflection under normal operational load. The brush holders also use a constant pressure coil spring to ensure contact between the brush(es)

126 and the slip ring 128. A micro switch may also be mounted at the base of the brush holder so as to trigger a warning signal if the brush has worn down too much.

As such, the ground brush 126 may be sized and oriented to engage the generator rotor 122 to facilitate providing an electrical connection from the generator rotor 122 to ground (not shown). Thus, the ground brush 126 is configured to protect the generator bearings 124 as well as all other components of the generator 118 from harmful electrical voltages and currents. More specifically, the ground brush 126 provides a low-impedance path around the bearings 124.

When the generator grounding system is compromised (i.e. the ground brush 126 loses contact with the rotor slip ring 128), an excess voltage builds up on the rotor shaft. This shaft voltage drives a current to find the lowest impedance path to ground. In the case of a wind turbine DFIG, this path is through the bearing housing. More specifically, the rotor shaft will accumulate voltage first. If the grounding system is compromised (i.e. the ground brush 126 is lifted), all components connected or coupled to the generator rotor 122 will begin to accumulate voltage. The outer race ball pass is where the majority of the discharge occurs due to the presence of lubricating oil. The oil has a low dielectric capacity and breaks down quicker than the surrounding air or other dielectric materials. Once this voltage exceeds the dielectric capacity of the lubricating oil in the bearing, it will discharge in a pulse, causing an arc. This cycle will repeat as long as the ground brush 126 is lifted, causing pitting and fluting of the bearing track, ultimately leading to bearing failure.

As such, the present disclosure is directed to detecting a ground brush lift event so as to prevent such damage. More specifically, as shown in FIG. 6, a flow diagram of one embodiment of the method 300 for detecting lifting of the ground brush 126 of the generator 118 is shown. For example, as shown at 302, the method 300 includes monitoring, via at least one sensor 130, a voltage signal of a rotor shaft of the rotor 122 of the generator 118. In certain embodiments, as shown in FIG. 5, the sensor(s) 130 may be mounted on a shaft-side of a bearing housing of the generator 118. In addition, the sensor(s) 130 may be mounted at any other suitable location such that the sensor(s) can monitor the rotor shaft voltage of the rotor 122. In further embodiments, the sensor(s) 130 measure the rotor shaft voltage without making physical contact with any generator component that may be at a high potential (i.e. rotor, bearing housing, etc.). Such a design criterion is configured to prevent potential electric discharge machining at the point of measurement due to insufficient input impedance of the sensor leads.

As such, in one embodiment as shown in FIG. 5, the sensor(s) 130 may include a plate configured with a controller 132, such as the turbine controller 202, a sensor internal processor, or an oscilloscope. Further, the plate of the sensor(s) 130 may have any suitable size and/or shape, may be located at any suitable distance above the generator rotor 122, and may be constructed of any suitable material (such as metal). More specifically, in one embodiment, the sensor(s) 130 may include a square plate, made of the same metal as the generator rotor 122 with a side length less than or equal to the rotor diameter, which should be suspended above the rotor 122. When two electrical conductors are separated by some dielectric material, a capacitance forms between them. Thus, the face of the rotor 122 acts as one conductor, while the plate of the sensor 130 acts as the other conductor, with the air between acting as the dielectric material. Through capacitive coupling, a voltage proportional to the rotor shaft voltage is induced on the plate during generator operation. Monitoring of this induced voltage provides an indirect indication of the shaft voltage waveform without requiring physical contact with the rotor 122. The controller 132 may then be used to measure the induced plate voltage. As used herein, an oscilloscope generally refers to an electronic test instrument that allows observation of constantly varying signal voltages via a two-dimensional plot of one or more signals as a function of time.

The controller 202 may also perform post-processing of the time-domain data to determine the frequency content. For example, in certain embodiments, the post-processing steps may include performing a Fourier transform, filtering, and/or any further post-processing steps so as to ensure the voltage signal is representative of a ground brush lift event and not simply noise.

As shown at 304, the method 300 includes determining at least one characteristic of the voltage signal for a predetermined time period. As mentioned, when the ground brush is lifted, a lift component or signal exists in the rotor shaft voltage. The lift component is characterized by having a high amplitude at the same frequency of the IGBT switching circuit used in the power converter of the variable frequency drive. As such, in one embodiment, the characteristic(s) of the voltage signal may include an amplitude, a frequency, or any other suitable component of the voltage signal or combinations thereof. More specifically, in certain embodiments, the controller 202 may determine whether the amplitude of the voltage signal is above a predetermined amplitude threshold for the predetermined time period. In addition, the controller 202 may determine whether the frequency of the voltage signal is within a predetermined frequency band. For example, in certain embodiments, the predetermined frequency band may correspond to a frequency band of a switching circuit (e.g. an IGBT switching circuit) of the power converter 210.

As shown at 306, the method 300 includes determining whether the at least one characteristic of the voltage signal is above a predetermined threshold, wherein the at least one characteristic of the voltage signal being above the predetermined threshold is indicative of the ground brush being lifted. For example, in certain embodiments, if the measured voltage signal remains within the acceptable frequency band and above the threshold amplitude for a predetermined period of time, the ground brush 126 is assumed to be lifted. Since the lift component of the voltage signal is indicative of the ground brush 126 being lifted, a control action may be taken if the lift component is present. For example, in further embodiments, as shown at 308, the method 300 may include implementing, via the turbine controller 26, a control action when the at least one characteristic of the voltage signal is above the predetermined threshold so as to prevent damage to the electrical power system 200 (such as the generator 118). More specifically, in certain embodiments, the controller 202 may be configured to open a normally closed contact of the electrical power system 200. Further, the normally closed contact can be connected to an external relay that communicates with the electrical power system 200. As such, the controller 202 can detect a change in state of the contact and alert an operator of a brush lift event, thereby preventing damage to the generator 118 and/or other components of the electrical power system 200. As used herein, the normally closed contact generally refers to a software algorithm that would trigger the alarm. Further, the turbine controller 202 may trigger the alarm based on the voltage level of the input signal from the sensor(s). Normally, this input would be high. If the ground 126 brush was lifted, however, the input would be low or zero.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for detecting lifting of a ground brush of a generator of an electrical power system connected to a power grid, the method comprising:
    monitoring, via at least one sensor, a voltage signal of a rotor shaft of the generator;
    determining whether a lift component of the voltage signal of the rotor shaft is present by observing a predetermined frequency band of the voltage signal and analyzing a frequency spectrum within the predetermined frequency band,
    wherein the lift component is present when an amplitude of a frequency component of the frequency spectrum is above a predetermined threshold, the lift component being present only when the ground brush is lifted, the predetermined frequency band corresponding to a frequency band of a switching circuit of a power converter of the electrical power system.

2. The method of claim 1, further comprising implementing, via a controller, a control action if the lift component is present so as to prevent damage to the electrical power system.

3. The method of claim 2, wherein implementing the control action further comprises opening a normally closed contact of the electrical power system.

4. The method of claim 1, wherein the at least one sensor is mounted on a shaft-side of a bearing housing of the generator.

5. The method of claim 1, wherein the generator comprises a doubly-fed induction generator (DFIG).

6. The method of claim 1, wherein the electrical power system is part of a wind turbine power system.

7. A method for preventing damage of a generator of a wind turbine power system connected to a power grid, the method comprising:
    monitoring, via at least one sensor, a voltage signal of a rotor shaft of the generator;
    determining whether a lift component of the voltage signal of the rotor shaft is present by observing a predetermined frequency band of the voltage signal and analyzing a frequency spectrum within the predetermined frequency band, wherein the lift component is present when an amplitude of a frequency component of the frequency spectrum is above a predetermined threshold, the lift component being present only when the ground brush lifted, the predetermined frequency band corresponding to a frequency band of a switching circuit of a power converter of the electrical power system; and
    implementing, via a turbine controller, a control action if the lift component is present so as to prevent damage to the generator of the wind turbine power system.

8. The method of claim 7, wherein implementing the control action further comprises opening a normally closed contact of the wind turbine power system.

9. An electrical power system connected to a power grid, comprising:
    a generator comprising a rotor and a stator;
    at least one sensor configured to monitor a voltage signal of a rotor shaft of the of the rotor of the generator; and,
    a controller configured to control the electrical power system, the controller configured to perform one or more operations, the one or more operations comprising:
        determining whether a lift component of the voltage signal of the rotor shaft is present by observing a predetermined frequency band of the voltage signal and analyzing a frequency spectrum within the predetermined frequency band, wherein the lift component is present when an amplitude of a frequency component of the frequency spectrum is above a predetermined threshold, the lift component being present only when the ground brush lifted, the predetermined frequency band corresponding to a frequency band of a switching circuit of a power converter of the electrical power system.

10. The electrical power system of claim 9, further comprising a power converter electrically coupled to the generator, the generator comprising a doubly-fed induction generator (DFIG).

11. The electrical power system of claim 9, wherein the at least one sensor is mounted on a shaft-side of a bearing housing of the generator.

\* \* \* \* \*